United States Patent [19]

Louis et al.

[11] 4,411,420

[45] Oct. 25, 1983

[54] CONVEYOR APPARATUS FOR THE TRANSPORTATION OF PLATES, STRIPS OR SHEETS OF MATERIAL ON CONTINUOUS BELTS

[75] Inventors: Jacques Louis, Bedarrides; Jean Gauthier, Soissons, both of France

[73] Assignee: La Rochette-Cenpa, Paris, France

[21] Appl. No.: 236,975

[22] Filed: Feb. 23, 1981

[30] Foreign Application Priority Data

Feb. 27, 1980 [FR] France ................. 80 04312

[51] Int. Cl.³ .............................. B65H 5/02
[52] U.S. Cl. ..................... 271/276; 271/197
[58] Field of Search ........... 271/276, 194, 196, 197, 271/96

[56] References Cited

U.S. PATENT DOCUMENTS 3,476,241 11/1969 Ungerer ..................... 271/197 X
3,663,011 5/1972 Mowry ...................... 271/276 X
4,030,727 6/1977 Jeschke ....................... 271/276
4,096,941 6/1978 Tokuno ...................... 271/197 X
4,211,399 7/1980 McGowan .................. 271/276 X Primary Examiner—Richard A. Schacher
Attorney, Agent, or Firm—Darby & Darby

[57] ABSTRACT

The invention relates to conveyor apparatus comprising substantially parallel conveyor belts, and seeks to provide such apparatus with means for reliably holding pieces of material fed seriatim to the apparatus on the conveyor belts. According to the invention, the belts (6) extend over a casing (10) which is formed with openings (12) forming elongate slits extending between the belts (6). In use, the negative pressure is created in the casing (10), and suction holds the pieces of material to the belts. The openings may be selectively closed by shutters (16) to adapt the effective suction area in accordance with the pieces (3) of material on the belts (6).

4 Claims, 2 Drawing Figures

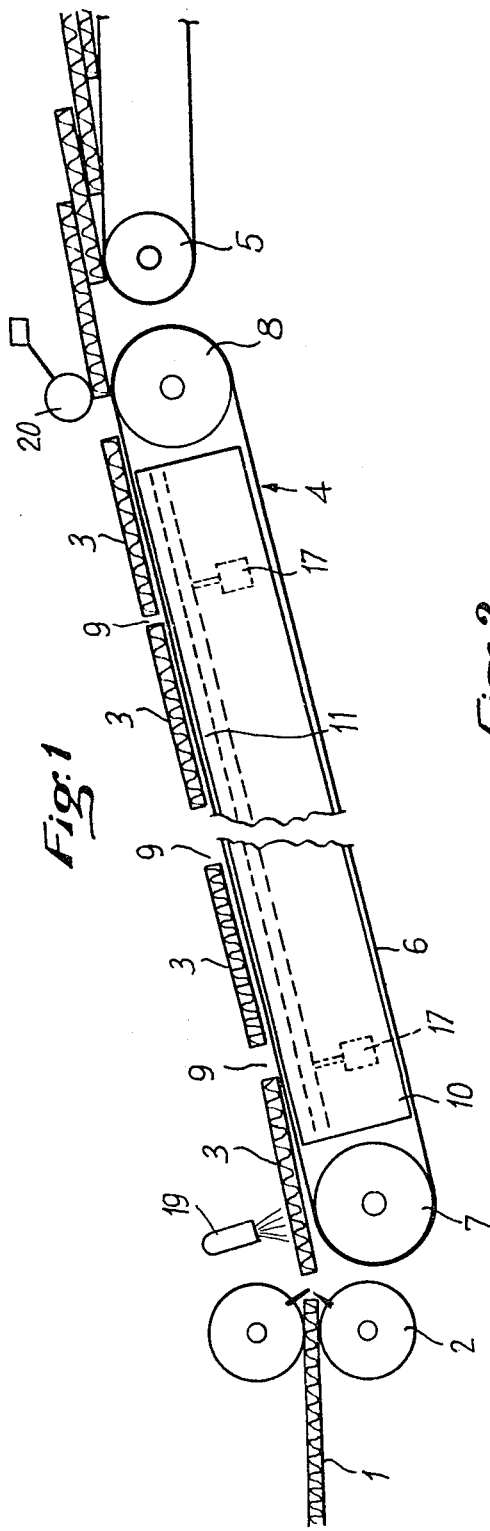
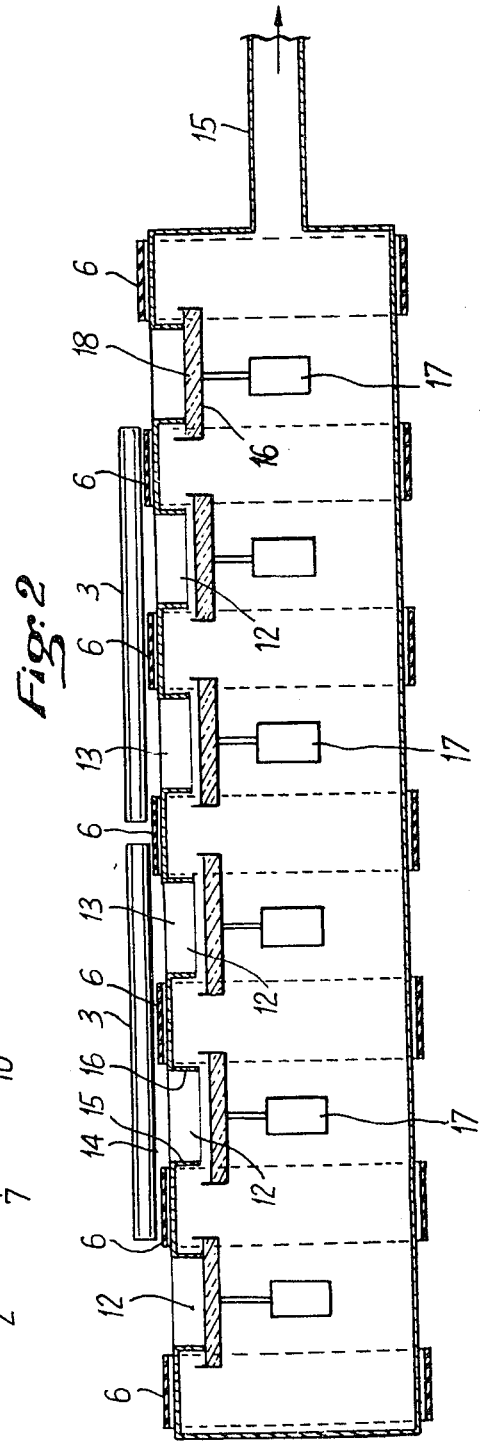

CONVEYOR APPARATUS FOR THE TRANSPORTATION OF PLATES, STRIPS OR SHEETS OF MATERIAL ON CONTINUOUS BELTS

BACKGROUND TO THE INVENTION

The invention relates to conveyor apparatus for the transportation of plates, strips or sheets of material on continuous belts. It has particular application to the transportation, at high speed of corrugated cardboard after it has been cut into pieces.

From a machine producing sheets of corrugated cardboard cut continuously to a required size, the sheets are conveyed at high speed, after cutting, to a stacking device. To enable this operation to be carried out efficiently, it is necessary for the sheets to be positioned accurately in relation to each other on the conveying device, and for them to follow exactly the motion of translation communicated to them by the conveyor in time and space.

There are several types of conveyor apparatus at present in existence, which are suited to this operation. In one such apparatus, the sheets are applied onto the bands or belts of a conveyor by means of pressure-rollers placed transversely at regular intervals across the entire width of the conveyor. Another type of conveyor system collects the sheets sandwiched between two sets of superimposed synchronous belts or bands. Pressure-rollers for example, are transversely placed so as to increase the pressure on the sheets exerted by the two sets of bands or belts. Apparatus using perforated suction belts are also known which involve much expenditure of energy and wear.

The above apparatus do not exert on the sheets a regular and continuous pressure in space on their entire surface. With the sheets not being held in position sufficiently against the belts of the conveyor, pile-ups may arise if one of the sheets moves out of place in relation to the others. Given the rhythmic movement of the machine, pile-ups generally have troublesome consequences and can cause prolonged stoppages in manufacture.

SUMMARY OF THE INVENTION

It is a primary aim of the present invention to provide a conveyor apparatus which alleviates these problems, enabling the relative position of the sheets with respect to each other to be substantially maintained, and the risk of pile-ups to be minimized.

According to the invention, conveyor apparatus for transportation of pieces of material comprises a plurality of substantially parallel endless belts extending over a casing, the casing defining openings in the form of slits extending between contiguous belts and of widths less than the spacing between said contiguous belts. Suction means may be applied to the slits to urge the pieces of material against the belts.

The apparatus may be adaptable to the width of the pieces of material being transported, and this is preferably accomplished by including shutters associated with the slits, the shutters being selectively closable to reduce the area exposed to the slits in accordance with the dimensions of the pieces of material being transported. Such shutters may be operated by jacks located within the casing.

The invention will now be described by way of example and with reference to the accompanying drawings.

BRIEF DESCRIPTION OF THE DRAWINGS

FIG. 1 is a diagrammatic sectional elevation of apparatus according to the invention; and FIG. 2 is a diagrammatic cross-section, perpendicular to that of FIG. 1, of apparatus according to the invention.

DESCRIPTION OF THE PREFERRED EMBODIMENT

In FIG. 1, 1 represents strips of cardboard, originating for example from a sheet of corrugated cardboard cut longitudinally into strips of a required width. The apparatus for transverse cutting is illustrated diagrammatically by 2. On leaving this transverse cutting machine, the cardboard is cut into sheets 3, which are taken up by a conveyor apparatus 4 to apparatus 5 which stacks them.

As represented diagrammatically in FIG. 2, apparatus 4 can convey several sheets of cardboard at one time. Several transverse cutting apparatus 2, conveyor apparatus 4 and stacking apparatus 5 can likewise be superimposed according to the required sizes of cut for the different sheets.

The conveyor apparatus 4 consists of parallel, equidistant continuous belts 6, situated between two sets of return-pulleys 7 and 8. These belts are brought into motion by means of one of the sets of return-pulleys, and by any suitable apparatus which from another source enables their motion to be regulated according to the requirements and rhythmic movements of the machine. In a preferred embodiment, this speed is slightly greater than the cutting sequence of the transverse cutting apparatus 2, so as to create an interval 9 between the sheets 3.

In their linear section, the belts are carried by a support 10, comprising slipping surfaces 11 facing each of the belts respectively. The slipping surfaces and the belts respectively are of any suitable material which reduces friction and promotes slipping at their areas of contact.

Support 10 is made up of a hollow, impervious casing. On its upper part it comprises openings 12 situated in the respective spaces between two adjoining belts. In a preferred embodiment, these openings are substantially horizontal slits, of a length substantially equal to the length of the linear section of the belts, and of a width slightly less than the distance between two contiguous belts. These openings are slightly recessed in relation to the plane of the conveyor surface, defined by the plane of the belts. Cavities 13 are thus formed by the under surface of the cardboard sheet, the plane of the opening 12 and the lateral walls 15 and 16 bordering the slipping surfaces.

Casing 10 is joined by means of a pipe 15 to an apparatus which maintains a reduced pressure in the casing. The negative pressure created in the casing spreads to the cavities 13 and exerts a suction on the sheets of cardboard 3 against the belts, such that these cover the cavities 13 along their entire length.

If the total width of the sheets does not cover the whole conveyor, shutters 16 may close the openings of the slits 12, so as to avoid intakes of air which might result through the uncovered slits. In FIG. 2 the two end shutters are represented in the closed position, the central shutters being represented in the open position. Each slit can be closed by an independent shutter. Each shutter is driven by a jack or jacks 17, which move to apply the shutter against the corresponding slit. In a preferred embodiment, the shutter 16 is U-shaped, the two flanges of which are situated at a distance greater than the width of opening 12. At the base of the shutter is a joint 18, of any suitable material, so as to ensure sound closure of the slit 12 when the corresponding shutter is in the closed position. This material may be an elastomer, for example.

In this way, all the sheets of cardboard are sucked against the belts 6 of the conveyor by a depression created inside the casing, which exerts a suction on the sheets by means of the openings 12. This negative pressure is created inside the casing by any suitable apparatus, for example by a helicoid ventilator with variable blades, which sucks the air from the interior of the casing and releases it outside. Only a relatively small negative pressure is sufficient to flatten the sheets of cardboard against the conveyor belts; the extent of pressure reduction is, however, adjustable.

It must be noted that the length of the slits corresponding to the spaces 9 between the sheets of cardboard constitutes an intake of air for the depression maintained inside the casing. These intakes of air, given their short length in relation to the length of the sheets, do not constitute any hindrance in the functioning of the apparatus.

It must also be noted that in cases where the cutting of strips into sheets of different dimensions, there may be variation in the spaces between the sheets. In this case, the conveyors at successive stages will not be covered on their entire width by sheets of cardboard. However, given that the width of cardboard conveyed at different stages is complementary, since it originates from a sheet of a defined width, the total suction which will be maintained in the different casings will be substantially the same as that which would be maintained in one casing, the entire width of which is covered by the sheets of cardboard. In fact, the total number of open slits on the different casings is substantially the same as that of the slits of one casing. Thus, the same apparatus for maintaining the depression could therefore be used for different casings.

In the operation of the embodiment described, sheets of cardboard are held against the belts by means of suction substantially along the length of the linear section of the belts. On entering the conveyor, the sheets are not immediately in contact with the belts, due to the presence of the set of return-pulleys 7. A device such as a brush 19 may be used to exert momentary pressure on the sheets of cardboard, until they are sucked and held by the depression inside the casing. This brush is situated transversely along the entire width of the conveyor and adjusts itself to the relief of the upper surface of the cardboard sheets, exerting pressure on them against the belts.

An alternative device can be used, and this is represented in FIG. 1 on the delivery end of the conveyor. It is composed of a multiplicity of independent pressure wheels, placed opposite each of the belts. These wheels are articulated and are drawn back elastically, for example by a spring, so as to exert pressure against the belts and the cardboard sheets, which become intercalated between the belts and the wheels. This device also offers the advantage of being able to adjust itself to the relief of the upper surface of the cardboard sheets, and hence exerting regular pressure on the entire width of the cardboard sheets against the belts. Devices identical to those just described can also be placed at either or both ends of the conveyor, so as to keep the cardboard sheets in position until they are taken up by the stacking apparatus.

In this way the cardboard sheets are kept in position along the entire length of the conveyor by the suction which holds them against the belts, and by a device such as the brush or the independent wheels, which apply them against the belts on entry and delivery.

The parameters of the conveyor apparatus according to the invention are the linear speed of the conveyor, and also the opening or closing of the different slits by the shutters 12. These different parameters can easily be integrated into a general programming of the machine according to its speed and the width of the sheets conveyed. In this programming it is possible to synchronise the opening or closure of the slits with the arrival onto the conveyor of sheets of cardboard in a new size.

We claim:

1. Apparatus for conveying pieces of material of various widths on a belt in a first direction, said widths being oriented in a direction transverse to said first direction, comprising:
a plurality of substantially parallel endless impervious belts extending over a hollow casing and including openings in the form of slits into the interior of said casing, said slits being coextensive with and extending along and between adjacent belts and having a width slightly less than the spacing between said belts;
means for inducing negative pressure within the interior of said casing; and
a plurality of shutters mounted within said casing said shutters being associated with a slit and being coextensive therewith and adapted to open and close said associated slit, whereby the number of open slits is selected according to the width dimension of the material conveyed by said belts to conserve said negative pressure.

2. Apparatus according to claim 1 including jacks located within the casing for operating the shutters independently of each other.

3. Apparatus according to claim 1 including a brush for applying pieces of material against the belts, such brush being located at at least one of the entry and exit ends of the apparatus.

4. Apparatus according to claim 1, including independent pressure wheels for applying pieces of material against the belts, such wheels being located at at least one of the entry and exit ends of the apparatus.

* * * * *